UNITED STATES PATENT OFFICE.

ARTHUR FRANKL, OF BERLIN, GERMANY.

REMEDY FOR SWINE-PLAGUE.

953,947.　　　Specification of Letters Patent.　　Patented Apr. 5, 1910.

No Drawing.　　Application filed November 4, 1908. Serial No. 461,043.

*To all whom it may concern:*

Be it known that I, ARTHUR FRANKL, a subject of the Hungarian King, and resident of 167 Friedrichstrasse, Berlin, Germany, have invented certain new and useful Improvements in Remedies for Swine-Plague, of which the following is a specification.

The object of my present invention consists of a composition of a remedy for swine plague. My remedy is hypodermically administered to the healthy animals in order to protect the same against swine plague.

The main substance of my composition consists according to my invention of the blood of the hedge hog (*Erinaceus*) who is very tenacious of life and very seldom sick.

In order to raise the effect 11.6 g. blood of the hedgehog are mixed with 6.5 g. water, 3.5 g. glycerin, 0.5 g. potassium iodid (KI), 0.1 g. camphor and 1 g. cooking salt.

The clotted parts of the entire mixture are removed by filtering the mixture.

Another very effective mixture consists of 23.3 g. blood of the hedgehog, 5 drops carbolic acid ($C_6H_5OH$), 6.5 g. water, 3.5 g. glycerin, 0.5 g. potassium iodid, 0.1 g. camphor and 1 g. cooking salt.

The named weights are not authoritative and can be changed.

The finished mixture must be kept cool.

Preferably I hypodermically administer to the swine both mixtures. First with 1 g. of the first described mixture and after a fortnight with 1 g. of the second mixture.

Practical trials have shown that a swine vaccinated as above described is indifferent against swine plague.

What I claim as new and desire to secure by a United States Letters Patent, is:—

A remedy for swine plague consisting of a composition composed of the serum of 11.6 g. blood of the hedgehog, 6.5 g. water, 3.5 g. glycerin, 0.5 g. potassium iodid, 0.1 g. camphor and 1 g. cooking salt.

In testimony whereof I have hereunto signed my name this 17th day of October 1908, in the presence of two subscribing witnesses.

ARTHUR FRANKL.

Witnesses:
　HENRY HASPER,
　WOLDEMAR HAUPT.